(12) United States Patent
Bryant

(10) Patent No.: US 12,209,000 B2
(45) Date of Patent: Jan. 28, 2025

(54) BENDER HANGER SECUREMENT METHOD AND SYSTEM

(71) Applicant: Nicholas Bryant, Shelbyville, IN (US)

(72) Inventor: Nicholas Bryant, Shelbyville, IN (US)

(*) Notice: Subject to any disclaimer, the term of this patent is extended or adjusted under 35 U.S.C. 154(b) by 0 days.

(21) Appl. No.: 18/367,107

(22) Filed: Sep. 12, 2023

(65) Prior Publication Data
US 2024/0083727 A1 Mar. 14, 2024

Related U.S. Application Data

(60) Provisional application No. 63/406,016, filed on Sep. 13, 2022.

(51) Int. Cl.
| | | |
|---|---|---|
| *B66F 13/00* | (2006.01) |
| *F16M 13/02* | (2006.01) |
| *A61H 3/02* | (2006.01) |
| *B62B 3/10* | (2006.01) |
| *B62B 3/14* | (2006.01) |

(52) U.S. Cl.
CPC ........... *B66F 13/00* (2013.01); *F16M 13/022* (2013.01); *A61H 3/0244* (2013.01); *B62B 3/102* (2013.01); *B62B 3/1416* (2013.01); *B62B 3/1472* (2013.01)

(58) Field of Classification Search
CPC ...... B66F 13/00; F16M 13/022; F16M 13/00; A61H 3/0244; B62B 3/102; B62B 3/1416; B62B 3/1472
See application file for complete search history.

(56) References Cited

U.S. PATENT DOCUMENTS

| | | | | |
|---|---|---|---|---|
| 4,036,368 A | * | 7/1977 | Munsch ................. | A01K 97/10 248/539 |
| D299,423 S | * | 1/1989 | Davis ........................... | D6/567 |
| 5,358,205 A | * | 10/1994 | Starkey ................. | F16B 7/0493 248/220.21 |
| 5,577,699 A | * | 11/1996 | Gardner .................... | A47F 5/08 248/302 |
| 6,932,312 B1 | * | 8/2005 | Chen ........................ | B25B 5/06 248/113 |
| 9,643,636 B2 | * | 5/2017 | Parnell .................... | B62B 3/102 |
| 10,363,773 B2 | * | 7/2019 | Pippus ................... | B44D 3/126 |
| 2020/0317489 A1 | * | 10/2020 | Bhatia .................. | B66F 11/042 |

* cited by examiner

*Primary Examiner* — Tan Le
(74) *Attorney, Agent, or Firm* — Overhauser Law Offices, LLC

(57) ABSTRACT

Conduit bender hanger method and system mountable on upper and lower guard rails of a lift platform includes lower and upper holders that fit over the guard rail of a platform lift and opposing flanges sized so that a conduit bender handle may be inserted between the respective opposing flanges and held in an upright orientation.

3 Claims, 3 Drawing Sheets

BENDER HANGER SECUREMENT METHOD AND SYSTEM

This US non-provisional patent application claims priority to and the benefit of U.S. non-provisional patent application Ser. No. 63/406,016 filed 13 Sep. 2022 the entire contents of which is specifically incorporated herein by reference.

FIELD OF THE INVENTION

The present invention relates to a method and system for making optimal use of space on a lift platform through devices for holding tools often used on lift platforms.

BACKGROUND

Lift platforms allow a worker to work at above ground elevation. Workers such as electricians on platform lifts, need to access and use tools such as conduit benders during a job. Often, workers leave such tools on the floor of the lift platform. They are prone to being accidentally kicked off the platform which is dangerous to others below the platform. Also, keeping such items on the floor requires the worker to repeatedly lean over to pick up the item. This leads to back injuries, as the platform is small and the worker cannot always position himself in an optimal position to bend over, and because if more than one worker is on the platform or is wearing a safety harness, mobility is limited. Having to reach for tools from a platform floor also takes time, and there is a desire to minimize the time required for any job. Also, construction tools need to be organized. For example a job can be completed more efficiently if necessary items such as conduit benders are always located in a consistent place on the lift, and is accessible without having to bend over.

It is also desirable to provide a system that can easily be relocated between different lift platforms, or to other locations on the same lift platform, and that does not require any hardware to attach it to the platform.

DETAILED DESCRIPTION

Figure 1:
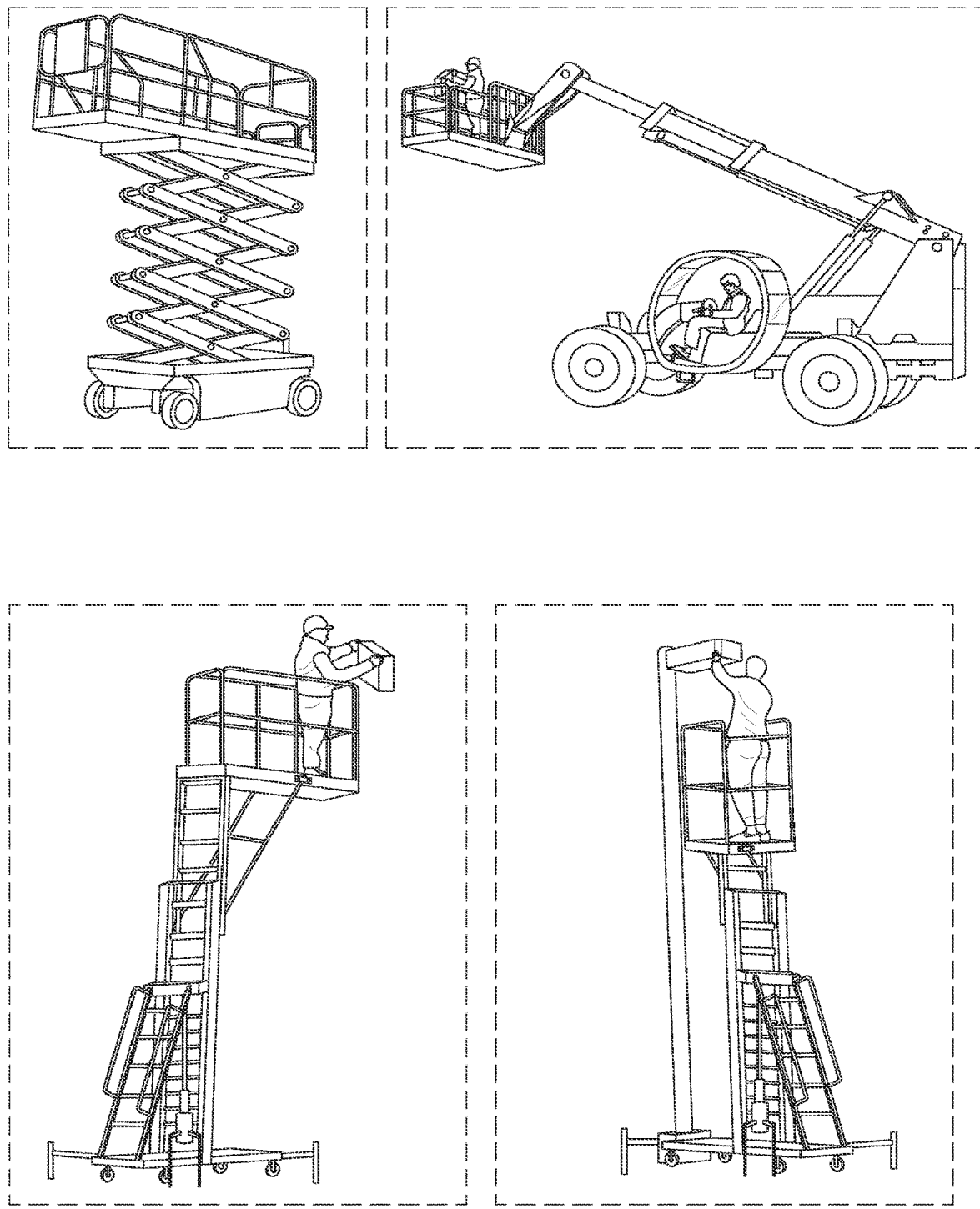
FIG. 1 shows representative prior art lift platforms having upper and lower guard rails.
Figure 2:
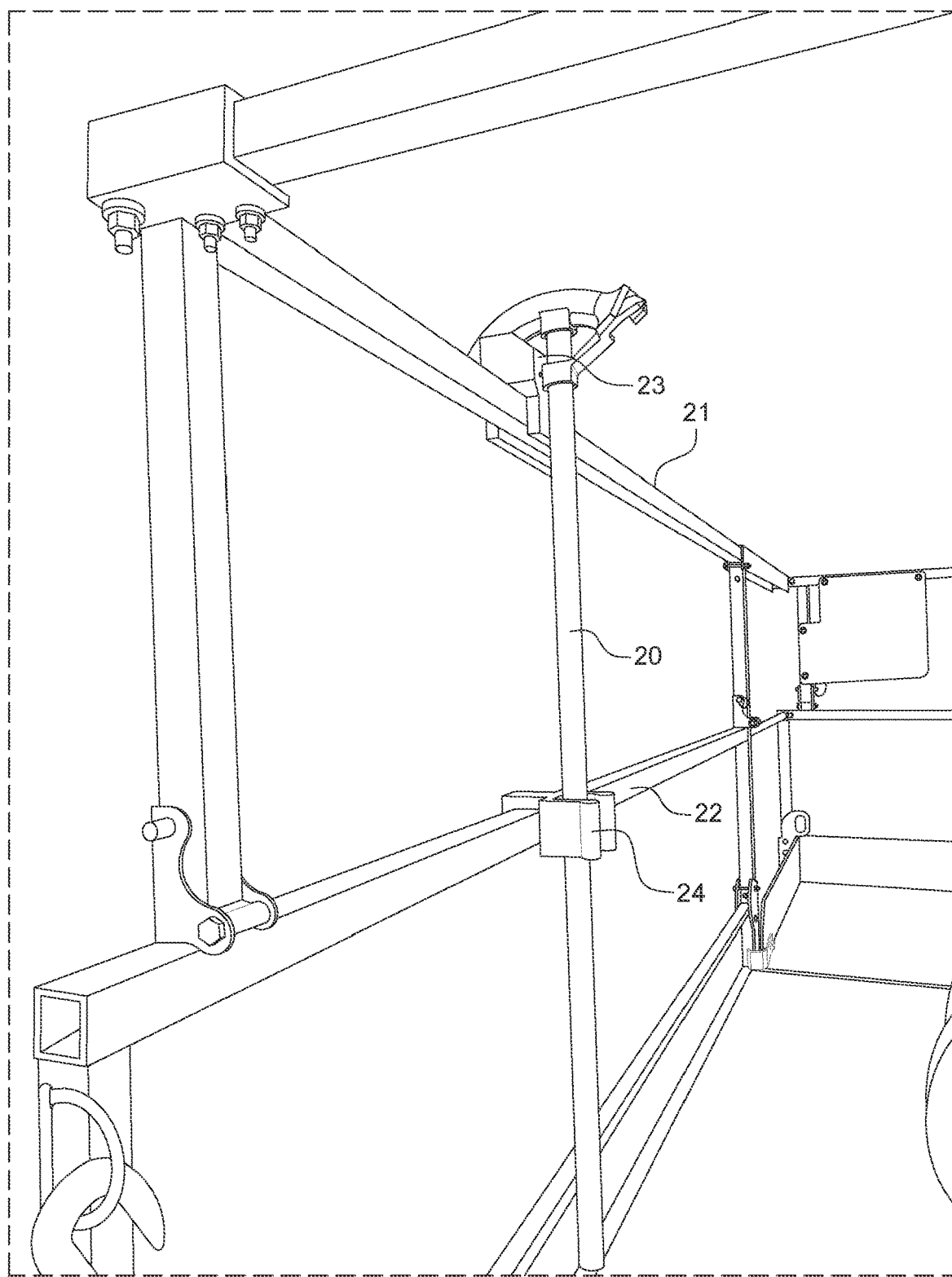
FIG. 2 shows a conduit bender mounted on the upper and lower guard rails of a lift platform.

FIG. 2 shows a conduit bender 20 mounted on the upper 21 and lower 22 guard rails of a lift platform so that the conduct bender is inside the platform and in an upright orientation. Upper holder 23 fits over top guard rail 21 and lower holder 24 fits over lower guard rail 22.

Figure 3:
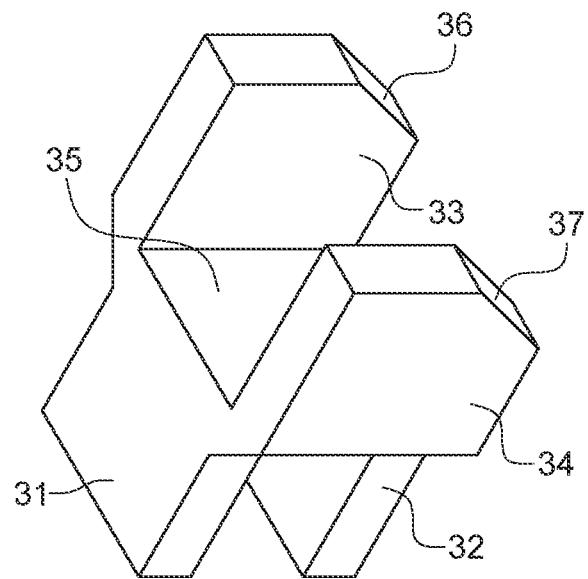
FIG. 3 is a perspective view of a conduit bender holder for the upper guard rail of a lift platform.

FIG. 3 is a perspective view of the conduit bender holder for the upper guard rail of a lift platform shown as 23 in FIG. 2. Upper holder has first 31 and second 32 lower projecting flanges spaced to fit over an upper guard rail. Upper holder also has first 33 and second 34 upper projecting flanges spaced to fit receive the working end of a conduit bender such as that shown as 20 in FIG. 2. The central body 35 of upper holder may be flat on its upper and lower surface. The preferably flat orientation of the lower surface of central body 35, along with the preferably flat orientation of the lower flanges 31 and 32 help prevent pivoting of the holder on the guard rail. First 33 and second 34 upper projecting flanges may be parallel and may also be beveled at corners 36, 37. In one embodiment, the distance between the outsides of lower projecting flanges is about 57.54 mm., the flanges are about 12.84 mm wide, and the distance between the lower projecting flanges is about 44.7 mm. In one embodiment, the distance between the outsides of upper projecting flanges is about 78.54 mm., the flanges are about 14.58 mm wide, and the distance between the upper projecting flanges is about 63.96 mm. These dimensions may be altered to fit the size of the upper guard rail of a lift or the size of a particular conduit bender.

Figure 4:
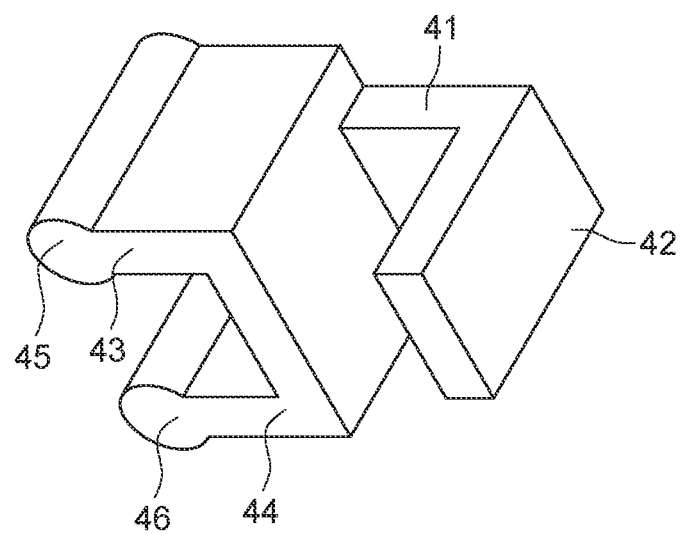
FIG. 4 is a perspective view of a conduit bender holder for the lower guard rail of a lift platform.

FIG. 4 is a perspective view of a conduit bender holder for the lower guard rail of a lift platform, e.g., 24 of FIG. 2. Lower holder may be positioned below upper holder as shown in FIG. 2. Lower holder includes a hook having an upper portion 41 and an outward portion 42 that fits over a lower guard rail of a platform lift. Attached to upper portion 42 are first and second flanges 43, 44, which are sized to receive the handle of a conduit bender as shown in FIG. 2. First and second flanges 43, 44 may each also include a slightly projecting surface between them 45, 46 which helps to hold the conduit bender handle first and second flanges. First and second flanges 43, 44 may be made of a flexible plastic so that a conduit bender, can be pressed between the projecting surface 45, 46 and held between the flanges. In one embodiment, the outer distance between the flanges is about 63.35 mm., and the flanges are about 12.89 mm. thick.

In another embodiment, the holders that fit over the upper and lower guard rails may be joined instead of being separate. By use of the conduit bender holders, a conduit bender may be stored on the lift platform in an upright position instead of being stored on the floor, where a worker would have to bend over to pick up the conduit bender. Moreover, upper and lower holders may be easily moved from one lift platform to another, and the system does not require physical modification of the guard rails or lift platform such as by drilling holes to attach holders.

A method for holding a conduit bender on a lift platform is as follows. Provide upper guard and lower holders as described above, position the upper guard rail holder on the upper guard rail of the platform lift, position the lower guard rail holder on the lower guard rail of the platform lift, provide a conduit bender having a working end, position the working end of the conduit bender between the upwardly projecting flanges of the upper conduit holder, and position the handle of the conduit bender between the first and second flanges of the lower conduit holder to thereby hold the conduit bender to the lift platform so that the it is in an upright orientation.

While the invention has been illustrated and described in detail in the foregoing drawings and description, the same is to be considered as illustrative and not restrictive in character, it being understood that only illustrative embodiments thereof have been show and described and that all changes and modifications that are within the scope of the following claims are desired to be protected.

All references cited in this specification are incorporated herein by reference to the extent that they supplement, explain, provide a background for or teach methodology or techniques employed herein.

What is claimed is:

1. A method for removably securing a conduit bender on a platform lift, the platform lift having a floor, an upper guard rail and a lower guard rail, comprising the steps of:
   providing an upper guard rail holder comprising
      a central body engagable with an upper surface of an upper guard rail of the platform lift,
      a pair of flanges upwardly extending from the central body having a distance between the flanges sized to receive a conduit bender,
      a pair of flanges downwardly extending from the central body having a distance between the flanges sized to fit around the upper guard rail of the platform lift;
   positioning the upper guard rail holder on the upper guard rail of the platform lift,
   providing a lower guard rail holder comprising
      a hook sized to fit over a lower guard rail of a platform lift, the hook having an upper portion and an outward portion;
      first and second flanges extending from the hook and separated by a distance sized to receive the handle of a conduit bender between them,
   positioning the lower guard rail holder on the lower guard rail of the platform lift,
   providing a conduit bender having a working end,
   positioning the working end of the conduit bender between the upwardly projecting flanges of the upper conduit holder,
   positioning the handle of the conduit bender between the first and second flanges of the lower conduit holder to thereby hold the conduit bender to the lift platform so that it is in an upright orientation.

2. A conduit bender hanger system mountable on guard rails of a platform lift having upper and lower guard rails comprising:
   an upper holder comprising
      a central body engagable with an upper surface of an upper guard rail of the platform lift,
      a pair of flanges upwardly extending from the central body having a distance between the flanges sized to receive a conduit bender,
      a pair of flanges downwardly extending from the central body having a distance between the flanges sized to fit around the upper guard rail of the platform lift;
   a lower holder comprising
      a hook sized to fit over a lower guard rail of a platform lift, the hook having an upper portion and an outward portion;
      first and second flanges extending from the hook and separated by a distance sized to receive the handle of a conduit bender between them.

3. The conduit bender hanger system of claim 2 wherein:
   the first and second flanges each further comprise a projecting surface between the flanges, and wherein,
   the first and second flanges comprise a flexible material such that a conduit bender, can be pressed between the projecting surfaces held between the flanges.

* * * * *